Patented Oct. 19, 1948

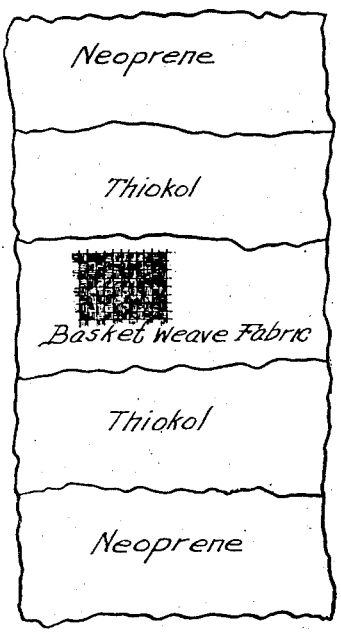
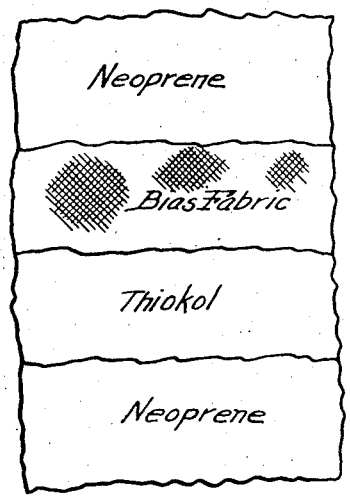
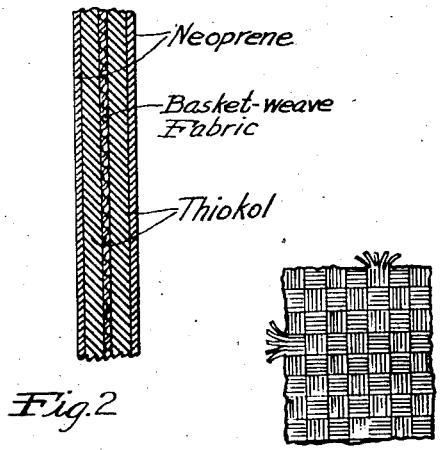
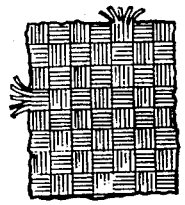
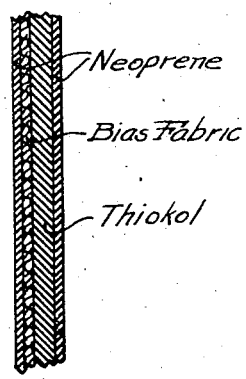

2,451,911

UNITED STATES PATENT OFFICE 2,451,911

LIQUID-HYDROCARBON-RESISTANT CONTAINER

Vally N. Braden, Akron, Ohio, assignor to Wingfoot Corporation, Akron, Ohio, a corporation of Delaware Application February 24, 1941, Serial No. 380,410

2 Claims. (Cl. 154—43.5)

This invention relates to materials and compositions for leakproof tanks, especially airplane fuel tanks which must be rendered as nearly leakproof as possible when pierced by bullets. More particularly, the invention relates to a material or composition for tanks which will resist leakage when pierced and which is also not attacked by liquid hydrocarbons, such as gasoline, contained in such tanks.

In the manufacture of liners for airplane fuel tanks there is ordinarily employed a synthetic rubber of a type which is not attacked by gasoline. Among such materials is Neoprene, a polymerized chloro butadiene. This material can be readily cemented to another Neoprene surface, thus making possible the overlapping union of one sheet with the next, but the Neoprene has a higher diffusion rate than is desirable and, hence, is not completely satisfactory. It has now been found that the material known as Thiokol, an organic polysulfide plastic, specifically, the reaction products of an alkaline polysulfide and a halogenized unsaturated hydrocarbon, such as ethylene dichloride, or a halogenized ether, such as dichlorethyl ether, has a much lower diffusion rate than Neoprene, but is subject to the objection that good cement unions between two Thiokol surfaces cannot be obtained. However, advantage can be taken of the desirable properties of both of these synthetics by forming a sheet of substantially 100% organic polysulfide plastic, thus utilizing the lower diffusion rate of this material and then providing an outer or surface coating of substantially 100% polymerized chloro butadiene, in order to present a surface which can be lapped over an adjoining sheet of the same construction and the two joined by means of a polymerized chlorobutadiene cement.

Usually, this will require a coating of the polymerized chlorobutadiene on both side of the organic polysulfide plastic since the overlap at the joint must provide two surfaces of this material for cementing together. However, only one coat may be present where joining can be effected under such circumstances.

Since the polymerized chlorobutadiene and the organic polysulfide plastic can be adhered together readily in the uncured state, the simplest form of the invention contemplates a layer of the polysulfide plastic provided with the required coating of chlorobutadiene plastic. Any incompatibility between the organic polysulfide plastic and the polymerized chlorobutadiene plastic may be avoided by applying a number of intermediate layers of a mixture of the two plastics, the layers or coatings having a successively increasing polymerized chlorobutadiene content as they approach the surface coating, or, what is the same thing, a successively increasing organic polysulfide plastic content as they approach the fabric base. In this way, an improved adhesion is obtained in the presence of gasoline because the differences in volume swell are equalized more uniformly and less stress develops at the bond.

A structure built up in this manner can be given any desired thickness and will resist both attack by the fuel in the tank and separation of the layers upon impact by a bullet. A fuel cell can be made up from sheets of the composition by lapping the sheets and cementing the polymerized chlorobutadiene surfaces, such a cell having a lower diffusion rate than those wherein polymerized chlorobutadiene alone is used as the plastic. For example, a balloon fabric spread with Neoprene passed gasoline by diffusion at the rate of 180 grams/sq. ft./90 hours, while a Neoprene-Thiokol mixture under the same conditions had a diffusion rate of only 17.3 grams/sq. ft./90 hours.

Various combinations of the plastics and fabric plies may be built up as desired, all in accordance with the principles of the invention. Thus, one fabric base, made up of one or more plies of fabric, can be coated in the manner described above, on both sides of such base. Also, two fabric layers may be employed, one on the bias and one straight, for example, and plastics may be applied on either side of the fabric layers and between such layers. Ordinarily, the plastic between two fabric layers may be substantially 100% organic polysulfide plastic since this portion of the lining is not involved when one sheet is joined to the next.

Certain embodiments of the invention are illustrated in the accompanying drawings in which Fig. 1 is a fragmentary view of a composite liner with the various plies broken away;

Fig. 2 is an enlarged section through the liner of Fig. 1;

Fig. 3 is an enlarged view illustrating certain fabric employed in the invention;

Fig. 4 is a fragmentary view, similar to Fig. 1, of another embodiment of the invention; and Fig. 5 is a section through the liner of Fig. 4.

The invention also contemplates the use of a special kind of fabric for the base of leakproof linings, the same having increased resistance to tear. This is known as basket-weave fabric and is made by weaving a number of threads simultaneously in parallel, both in the warp and the woof. Thus, one such basket-weave fabric which has been employed has five threads in parallel in both directions of the weave, presenting an appearance of squares the width of five such threads. This basket-weave fabric affords great resistance to tear when a liner is pierced by a bullet or other object. Fabric cut on the bias may also be employed and also offers great resistance to tearing but the use of the basket-weave type eliminates considerable weight, a matter of great importance in airplane structures, and is also less expensive than bias construction.

The invention is illustrated by the following liner compositions, Neoprene being indicated by N and Thiokol being indicated by T.

| (a) | oz./yd. | (b) | oz./yd. |
|---|---|---|---|
| N 100% | 1.0 | N 100% | 2.0 |
| N 75% T 25% | .5 | N 50% T 50% | 1.0 |
| N 50% T 50% | .5 | Fabric-Bias | 2.0 |
| N 25% T 75% | .5 | T 100% | 3.5 |
| Fabric-Bias | 2.0 | Fabric-Str | 2.0 |
| T 100% | 3.5 | N 50% T 50% | 1.0 |
| Fabric-Str | 2.0 | N 100% | 2.0 |
| N 25% T 75% | .5 | | 12.5 |
| N 50% T 50% | .5 | | |
| N 75% T 25% | .5 | | |
| N 100% | 1.0 | | |
| | 12.5 | | |

| (c) | oz./yd. | (d) | oz./yd. |
|---|---|---|---|
| N 100% | 3.0 | Neoprene 100% | 1.00 |
| Fabric-Bias | 2.0 | N 50% T 50% | 1.00 |
| T 100% | 3.5 | T 100% | 2.00 |
| N 100% | 3.0 | Basket-Weave Fabric | 5.25 |
| | 11.5 | T 100% | 2.00 |
| | | N 50% T 50% | 1.00 |
| | | N 100% | 1.00 |
| | | | 13.25 |

Although the invention has been described more particularly with respect to Neoprene and Thiokol, it will be understood that other plastics of similar type may also be used; thus, in place of Neoprene there may be used other polymerized halobutadienes and in place of Thiokol there may used any of the organic polysulfide plastics. Such polysulfide plastics are those prepared by reaction of various hydrocarbons or ethers, or halogen derivatives of the same, with an inorganic sulfide. There may also be used in place of Thiokol, copolymerized butadiene-acrylonitrile, e. g., Buna N, and similar copolymers of a butadiene and an acrylonitrile. However, it is preferred to use polymerized 2-chlorobutadiene-1,3, on the one hand, and a halogenated ether-polysulfide plastic, on the other hand, since best results have been obtained with these.

While there have been described above the preferred embodiments of the invention, it will be apparent to those skilled in the art that various modifications and changes may be made therein without departing from the spirit of the invention or from the scope of the appended claims.

I claim:

1. A liquid-hydrocarbon-resistant container comprising sheets of ethylene-dichloride-polysulphide plastic coated and overlapped on both sides with Neoprene (polymerized chlorobutadiene) and cured; said sheets constituting faces of said container and being joined to each other at the perimeter of the faces by a cemented union of the Neoprene overlaps.

2. A liquid-hydrocarbon-resistant container comprising sheets of ethylene-dichloride-polysulphide plastic coated on at least one side with successive layers of mixed ethylene dichloride polysulphide plastic and polymerized chlorobutadiene of diminishing ethylene dichloride polysulphide plastic content and a final overlapping coat of polymerized chlorobutadiene, said sheets constituting faces of said container and being joined to each other at the perimeter of the faces by a cemented union of the polymerized chlorobutadiene overlaps.

VALLY N. BRADEN.

REFERENCES CITED

The following references are of record in the file of this patent:

UNITED STATES PATENTS

| Number | Name | Date |
|---|---|---|
| 1,297,305 | Thacher | Mar. 11, 1919 |
| 1,779,388 | Calvert | Oct. 21, 1930 |
| 1,931,922 | Damsel et al. | Oct. 24, 1933 |
| Re. 19,487 | Patrick | Mar. 5, 1935 |
| 2,049,974 | Patrick | Aug. 4, 1936 |
| 2,102,590 | Gray et al. | Dec. 21, 1937 |
| 2,126,818 | Sager | Aug. 16, 1938 |
| 2,170,947 | Habgood | Aug. 29, 1939 |
| 2,197,127 | Eger | Apr. 16, 1940 |
| 2,212,611 | Macdonald | Aug. 27, 1940 |
| 2,271,125 | Juve | Jan. 27, 1942 |
| 2,308,724 | Stamberger | Jan. 19, 1943 |

FOREIGN PATENTS

| Number | Country | Date |
|---|---|---|
| 716,135 | France | Oct. 5, 1931 |